3,330,626
MANUFACTURE OF HYDROGEN PEROXIDE
Jacques Olivier Archambault, Ville Lemoyne, Quebec, and George Russell Lusby, St. Hilaire Station, Quebec, Canada, assignors to Canadian Industries Limited, Montreal, Quebec, Canada, a corporation of Canada
No Drawing. Filed Feb. 3, 1965, Ser. No. 430,177
Claims priority, application Canada, Apr. 2, 1964, 899,443
4 Claims. (Cl. 23—207)

This invention relates to an improved process for the manufacture of hydrogen peroxide.

In Canadian Patent No. 673,355 issued on Oct. 29, 1963, there is disclosed a process for the manufacture of hydrogen peroxide by the reduction of the disodium salt of an anthraquinone disulphonic acid with hydrogen sulphide and subsequent oxidation of the reduced product with oxygen. The resulting hydrogen peroxide is separated from the alkaline disodium anthraquinone disulfonate solution by precipitation as calcium peroxide by the addition of calcium hydroxide at room temperature. The calcium peroxide product is separated from the aqueous solution of anthraquinone disulphonic acid salt and is subsequently converted to hydrogen peroxide by known methods such as that described in U.S. Patent No. 2,695,217. However, the known methods of converting calcium peroxide to hydrogen peroxide yield a solution or slurry of the calcium salt containing hydrogen peroxide from which the hydrogen peroxide must be separated. The elimination of the separation process therefore would simplify the recovery of the hydrogen peroxide from the reaction mixture.

Likewise in the process for the production of hydrogen peroxide by the reaction of barium peroxide with an acid, the hydrogen peroxide product must be separated from the barium salt.

It is an object of this invention to provide an improved process for the manufacture of hydrogen peroxide wherein an alkaline earth metal peroxide product is efficiently converted to hydrogen peroxide. Another object is to provide a liquid-liquid extraction process for the recovery of hydrogen peroxide from alkaline earth metal peroxides. Additional objects will appear hereinafter.

The improved process of this invention comprises contacting an aqueous slurry of an alkaline earth metal peroxide with a water insoluble organic acid dissolved in a water-immiscible solvent, whereby the metal peroxide reacts with the organic acid to form an aqueous solution of hydrogen peroxide and a metal salt of the organic acid which is soluble in the water-immiscible solvent, separating the aqueous solution from the water-immiscible solution, treating the water-immiscible solution of the metal salt of the organic acid with an aqueous solution of an inorganic acid, thereby regenerating the organic acid, and separating the metal in the form of a salt of the inorganic acid from the water-immiscible solvent, the regenerated solution of the organic acid being then employed for the extraction of further portions of the aqueous slurry of alkaline earth metal peroxide. It has been found that the alkaline earth metal salt of the inorganic acid is either soluble or dispersible in the aqueous phase and therefore can readily be separated from the water-immiscible solvent.

It is envisaged as a modification of the aforesaid process that the solution of the alkaline earth metal salt of the organic acid dissolved in a water-immiscible solvent be extracted with water to remove residual hydrogen peroxide carried over into the water-immiscible solvent. The aqueous solution of hydrogen peroxide thus obtained may be added to the aqueous solution of hydrogen peroxide obtained by the primary separation.

The organic acids suitable for employment in the process of this invention include those branched chain organic acids containing at least eight carbon atoms and which are substantially water-insoluble but are soluble in water-immiscible solvents. It has been found that suitable organic acids are naphthenic acid, di(2-ethylhexyl) phosphoric acid, 2-ethylhexanonic acid and tertiary monocarboxylic acids with nine to eleven carbon atoms in the main chain known as "Versatic" 911.

The water-immiscible solvents suitable for use in the process of invention are aromatic and aliphatic hydrocarbons which do not react with peroxide and which have serviceable viscosity and volatility at room temperature. Examples of said solvents are xylene, toluene, n-hexane, cyclohexane and kerosene.

Water soluble acids suitable for regeneration of the water-immiscible organic acid include sulphuric acid, sulphurous acid, phosphoric acid, hydrochloric acid and nitric acid. It has been found that carbon dioxide may be employed to regenerate 2-ethylhexanoic acid and tertiary monocarboxylic acids containing nine to eleven carbon atoms in the main chain. Regeneration with carbon dioxide has commercial attraction in the case of the latter carboxylic acid since a cyclic process is possible, the by-product calcium carbonate being calcined to form dilute carbon dioxide (ca. 30%) which can be used again for conversion of additional portions of the calcium salt of the carboxylic acid.

The process of this invention may be carried out with any of the known apparatus which can be used for liquid-liquid extraction. Equipment may be of the type used for continuous counter current extraction or may be mixing-settling tanks.

More particularly, in the preferred embodiment of this invention, the calcium peroxide slurry which normally contains small amounts of the sodium salt of an anthraquinone disulphonic acid is extracted with a solution of the organic acid (10% to 50% by weight) in a water-immiscible solvent. The distribution coefficients of hydrogen peroxide and the organic acid calcium salt between the organic and aqueous phases are such that the majority of the hydrogen peroxide will remain in the aqueous phase and the organic salt will remain in the water-immiscible phase. The two phases are then separated. The hydrogen peroxide remaining in the organic phase can then be extracted with a water wash. The calcium salt of the organic acid dissolved in the water-immiscible solvent is then treated with an aqueous soltuion of an inorganic acid such as phosphoric acid. In this manner the organic acid is regenerated and the calcium salt of the water soluble acid is formed. The distribution coefficients between the organic and aqueous phases are such that the organic acid remains in the water-immiscible solvent. The calcium salt of the inorganic acid remains dissolved or dispersed in the aqueous phase. After separation of the two phases the organic acid can then be used for the treatment of the next portion of calcium peroxide.

In comparison to the usually employed processes for the recovery of hydrogen peroxide from calcium peroxide, the liquid-liquid extraction procedure of this invention provides a much higher concentration of hydrogen peroxide in aqueous solution. For example, using calcium peroxide octahydrate, aqueous solutions containing 15 to 17% hydrogen peroxide can be obtained. In normally employed processes, the concentration of hydrogen peroxide is likely to be less than 5%.

The invention is additionally illustrated by the following examples.

*Examples 1–14*

A series of experiments was carried out wherein hydrogen peroxide was recovered from calcium peroxide employing solutions of 2-ethylhexanoic acid in xylene. The said solutions contained 2-ethylhexanoic acid in concentrations in the range from 10% to 33% by weight. The calcium peroxide was employed as calcium peroxide octahydrate, calcium peroxide dihydrate and an aqueous slurry of anhydrous calcium peroxide (ratio of $CaO_2/H_2O$ being 2/1). The calcium peroxide was agitated at room temperature with xylene/acid solution and the xylene solution was then removed by decantation. The decanted xylene solution was then extracted with water to remove dissolved hydrogen peroxide. The percentage of hydrogen peroxide in both of the aqueous solutions was then determined. The results of the experiments are shown in Table I.

TABLE I

| Ex. | Solvent, Percent ethylhexanoic acid in xylene | Feed-Solid component of aqueous phase | Ratio Solvent to Feed | Percent $H_2O_2$ in aqueous phase | Percent $H_2O_2$ recovered in aqueous phase | Percent $H_2O_2$ recovered from organic phase | Total recovery, Percent |
|---|---|---|---|---|---|---|---|
| 1 | 10 | $CaO_2 \cdot 8H_2O$ | 100/6 | 20.0 | 71.0 | 22 | 93 |
| 2 | 10 | $CaO_2 \cdot 2H_2O$ | 100/3 | | 39 | 39 | 74 |
| 3 | 10 | $CaO_2$ | 100/2 | 21.0 | 77.7 | 16.3 | 78 |
| 4 | 20 | $CaO_2 \cdot 8H_2O$ | 100/11 | 15.6 | 47.7 | 50.8 | 94 |
| 5 | 20 | $CaO_2 \cdot 2H_2O$ | 100/4.8 | 42.8 | 79 | 23 | 98.5 |
| 6 | 20 | $CaO_2$ | 710/28 | 24.6 | 57 | 28 | 102 |
| 7 | 20 | $CaO_2 \cdot 2H_2O$ | 925/65 | 30.5 | 80.1 | 21.8 | 85 |
| 8 | 25 | $CaO_2 \cdot 8H_2O$ | 100/15 | 16.7 | 87.4 | 16.4 | 101.9 |
| 9 | 25 | $CaO_2 \cdot 8H_2O$ | 100/15 | 17.1 | 83 | | 103.8 |
| 10 | 25 | $CaO_2 \cdot 8H_2O$ | 300/45 | 14.6 | 37.4 | 51.5 | 88.9 |
| 11 | 25 | $CaO_2$ | 1,000/50 | 35.1 | 58.3 | 29.4 | 87.7 |
| 12 | 25 | $CaO_2$ | 175/7.5 | 27.6 | 55.5 | 32.2 | 87.5 |
| 13 | 25 | $CaO_2$ | 415/16.5 | 28.8 | 79.1 | 21.7 | 100.8 |
| 14 | 33 | $CaO_2 \cdot 8H_2O$ | 100/20 | 16.9 | | | |

The percentages are by weight.

It can be seen that if the organic phase is extracted with water after separation from the aqueous phase effective conversion of calcium peroxide to hydrogen peroxide is attained.

*Examples 15–20*

A series of experiments was carried out wherein hydrogen peroxide was recovered from calcium peroxide employing solutions of tertiary monocarboxylic acids with chain lengths of nine to eleven carbon atoms ("Versatic" 911) in xylene and kerosene. The said solutions contained the organic acid in concentrations in the range from 25% to 50% by weight. The calcium peroxide was employed as calcium peroxide octahydrate and an aqueous slurry of anhydrous calcium peroxide (ratio of $CaO_2/H_2O$ being 2/1). The calcium peroxide was agitated at room temperature with the organic acid solution and the organic solution was then removed by decantation. The decanted organic solution was then extracted with water to remove dissolved hydrogen peroxide. The percentage of hydrogen peroxide in both the aqueous solutions was then determined. The results of the experiments are shown in Table II.

TABLE II

| Ex. | Solvent, percent tertiary monocarboxylic acid | Feed-Solid component of aqueous phase | Ratio Solvent to Feed | Percent $H_2O_2$ in aqueous phase | Percent $H_2O_2$ recovered in aqueous phase | Percent $H_2O_2$ recovered from organic phase | Total recovery, percent |
|---|---|---|---|---|---|---|---|
| 15 | 25% in xylene | $CaO_2 \cdot 8H_2O$ | 100/10 | 14.8 | 75 | 24 | 99 |
| 16 | do | $CaO_2 \cdot 8H_2O$ | 1,000/100 | 14.8 | 79 | 15 | 94 |
| 17 | do | $CaO_2$ | 1,000/33 | 21.2 | 47 | 22 | 69 |
| 18 | 50% in xylene | $CaO_2 \cdot 8H_2O$ | 100/20 | 15.3 | 75 | 15 | 90 |
| 19 | do | $CaO_2$ | 100/7 | 27 | 60 | 36 | 96 |
| 20 | 25% in kerosene | $CaO_2 \cdot 8H_2O$ | 100/10 | 11.2 | 56 | 8 | 64 |

The percentages are by weight.

*Examples 21–25*

A series of experiments was carried out wherein hydrogen peroxide was recovered from barium peroxide employing solutions (25% by weight in xylene) of ethylhexanoic acid, di-(2-ethylhexyl) phosphoric acid, naphthenic acid and the tertiary monocarboxylic acids with chain lengths of nine to eleven carbon atoms ("Versatic" 911). The barium peroxide was employed either as a slurry in water equivalent to one quarter of the volume of the organic solution or was added to a two phase system of organic solution and one quarter its volume of water. The two phase system was agitated at room temperature and the organic phase separated by decantation. In Examples 21 to 24 additional water was added prior to decantation. In the case of Example 25 the organic phase was decanted and then extracted with an additional portion of water. The percentage of hydrogen peroxide in the aqueous phases was determined. The results are shown in Table III.

TABLE III

| Ex. | Solvent System (Percent Acid in Xylene) | Feed | G. Solvent/ g. $BaO_2$ | Aqueous Phase Percent $H_2O_2$ | Aqueous Phase Percent Recovery by Decantation | Organic Phase, Percent Recovery by Water-Extraction | Total Recovery, Percent |
|---|---|---|---|---|---|---|---|
| 21 | 25% ethylhexanoic acid | $BaO_2$ slurried in water | 100/10 | 2.89 | 84 | | 84 |
| 22 | 25% di-(2-ethylhexyl) phosphoric acid | $BaO_2$ (dry) | 100/5 | 1.16 | 58 | | 58 |
| 23 | 25% naphthenic acid | $BaO_2$ slurried in water | 100/7 | 1.02 | 36.5 | | 36.5 |
| 24 | 25% tertiary monocarboxylic acid | do | 100/7 | 1.98 | 71 | | 71 |
| 25 | 25% tertiary monocarboxylic acid | $BaO_2$ (dry) | 100/6 | 8.8 | 42.5 | 30 | 72.5 |

The percentages are by weight.

It was found that the organic solutions of the alkaline earth metal salts of organic acids were readily regenerated by contacting with equivalent volumes of dilute (3 molar) solutions of either hydrochloric or nitric acids. The inorganic acids formed salts with the alkaline earth metals regenerating the organic acids. The inorganic salts of alkaline earth metals were readily extracted in the aqueous solution of inorganic acid.

The effectiveness of the regeneration procedure is shown in Table IV.

TABLE IV

| Example | Organic Acid whose Calcium Salt is dissolved in Organic Solvent | Inorganic acid | Ratio Equiv. Acid/Equiv. Calcium | Percent Calcium in Organic Solvent | | Percent Regeneration |
|---|---|---|---|---|---|---|
| | | | | Initial | Final | |
| 26 | Di-(2-ethylhexyl) phosphoric Acid in Kerosene (35%) | HCl (2N) | 1.6 | 2.47 | 0.002 | 99.9 |
| 27 | Di-(2-ethylhexyl) phosphoric Acid in Cyclohexane (35%) | $H_2SO_4$ (0.61 N) | 1.0 | 1.22 | 0.06 | 95 |
| 28 | Di-(2-ethylhexyl) phosphoric Acid in Cyclohexane (35%) | $H_2SO_4$ (1.0 N) | 1.6 | 1.22 | 0.014 | 99 |
| 29 | 2-ethylhexanoic acid in Xylene (20%) | $CO_2$ gas* (100%) | | 1.4 | 0.045 | 97 |
| 30 | Tertiary monocarboxylic acid "Versatic" 911 in Xylene (25%) | $CO_2$ gas* (30% in nitrogen) | | 1.36 | 0.036 | 97 |
| 31 | Naphthenic Acid in Cyclohexane (25%) | $SO_2$ gas* (11% in air) | | 0.88 | 0.005 | 99 |

*Gas was bubbled through the two-phase system.

Examples 26–31

A series of experiments was carried out in which different organic acids were regenerated from their calcium salts, the calcium salt being in solution in an organic solvent.

In Examples 26–28 the solution of the calcium salt of the organic acid dissolved in the organic solvent was shaken with an aqueous solution of the inorganic acid, the equivalent ratio of acid to calcium being as indicated in Table IV. The aqueous solution was then separated from the organic solution. The content of calcium in the organic solution was determined before and after the regeneration step.

In Examples 29–31 the organic solution of the calcium salt of the organic acid was placed in a vessel with half its volume of water and the gas (carbon dioxide or sulphur dioxide) was bubbled through the two phase system. In Example 30 the carbon dioxide was diluted with nitrogen. In Example 31 the sulphur dioxide was diluted with air. The two phases were then separated. The calcium content of the organic solvent was determined before and after the regeneration step.

What we claim is:
1. A process for converting calcium peroxide or barium peroxide to hydrogen peroxide which comprises contacting said peroxide in the presence of acid-free water with a water-insoluble organic acid dissolved in a water-immiscible solvent, thus forming an aqueous solution of hydrogen peroxide and a solution of the calcium or barium salt of the organic acid dissolved in the water-immiscible solvent, separating the aqueous solution of hydrogen peroxide from the water-immiscible solution, contacting the water-immiscible solution of the calcium or barium salt of the organic acid with an aqueous solution of an inorganic acid, thus forming the calcium or barium salt of the inorganic acid and a solution of the regenerated organic acid in the water-immiscible solvent, and separating the said alkaline earth metal salt from the solution of the regenerated organic acid.

2. A process as claimed in claim 1 wherein the water-immiscible solution of the calcium or barium salt of the organic acid is extracted with water to remove the hydrogen peroxide dissolved therein.

3. A process as claimed in claim 1 wherein the organic acid is a branched chain organic acid containing at least eight carbon atoms.

4. A process as claimed in claim 1 wherein the organic acid is selected from the group consisting of di(2-ethylhexyl) phosphoric acid, naphthenic acid, 2-ethylhexanoic acid and tertiary monocarboxylic acids with chains containing nine to eleven carbon atoms.

References Cited

UNITED STATES PATENTS 2,614,907  10/1952  Cook _____ 23—207

OTHER REFERENCES

Peppard et al.: "Fractional Extraction of the Lanthanides as Their Di-Alkyl Orthophosphates," J. Inorg. & Nuclear Chem. 4, pp. 334–343 (1957).

OSCAR R. VERTIZ, *Primary Examiner.*

H. S. MILLER, *Assistant Examiner.*